3,231,546
SOLID STYRENE-SULFUR COMPOUNDS AND VULCANIZATES MADE THEREWITH

Eugene R. Bertozzi, Yardley, Pa., Jack M. Solomon, Franklin Park, N.J., and Stanley Schreiber, Levittown, Pa., assignors to Thiokol Chemical Corporation, Bristol, Pa., a corporation of Delaware
No Drawing. Filed Oct. 6, 1961, Ser. No. 143,308
7 Claims. (Cl. 260—79)

This invention relates to styrene-sulfur compounds and more particularly, to a novel class of reaction products of styrene and sulfur that are especially useful in the vulcanization of rubbers.

It is known that styrene and sulfur can be reacted at temperatures of the order of 150° C. to produce viscous liquid products having sulfur ranks of the order of 1 to 5. Sulfur rank as the term is used in this art is the ratio of the moles of sulfur in the product to moles of organic monomeric units, e.g., styrene units, in the product. It is further known that such liquid sulfur-bearing products may be used in place of elemental sulfur in the vulcanization of rubbers and that when so used they provide certain advantages over the use of sulfur per se.

The utility as rubber-vulcanizing agents of liquid styrene-sulfur compounds having sulfur ranks of 2 to 5 is disclosed in Hendry et al. Patent 2,989,513. Such liquid sulfur-bearing compounds can be incorporated in rubber at a lower temperature than is customary when elemental sulfur is used. Thus the use of these liquid vulcanizing agents makes it possible to employ a less drastic heating cycle and thus obtain a vulcanized product having improved physical properties.

Another problem encountered when rubbers are vulcanized with elemental sulfur is the migration of the curing agent to the surface of the rubber stock to produce a visible discoloration known as "blooming." It has been found that the liquid styrene-sulfur polymers are appreciably more bloom-resistant than elemental sulfur.

While the use of the liquid styrene-sulfur polymers as vulcanizing agents for rubber leads to certain advantages as outlined above, their use as vulcanizing agents is subject to a number of disadvantages in comparison with the results achieved with elemental sulfur. Thus while fine powders can be incorporated in a rubber stock in a relatively easy manner by milling, it is relatively difficult to incorporate a viscous liquid, such as the liquid styrene-sulfur polymers mentioned above, into the rubber stock. In general, considerably longer periods of time are required to disperse such viscous liquids to an acceptable extent in a rubber stock. Moreover, the organic portion of the styrene-sulfur polymer tends to exert a plasticizing effect on the rubber, thus producing a softer vulcanizate for a given quantity of available sulfur in the curing agent.

It is accordingly an object of the present invention to provide a rubber vulcanizing agent which combines the advantageous properties of both elemental sulfur and the liquid styrene-sulfur polymers, while at the same time eliminating the disadvantages of both of these types of curing agents. It is another object of the invention to provide a rubber vulcanizing agent which is normally a solid powder and which contains a relatively high proportion of sulfur, but has a softening or melting point well below the melting temperature of sulfur so that it can be incorporated in rubber at a substantially lower temperature than when elemental sulfur is used. It is still another object of the invention to provide a rubber vulcanizing agent which has the bloom-resistant properties of the liquid styrene-sulfur polymers without exhibiting their softening effect on rubber stocks in which they are incorporated. Other objects of the invention will be in part obvious and in part pointed out hereafter.

The present invention is predicated on the findings that by reacting styrene and sulfur in suitable proportions under suitable reaction conditions, it is possible to produce a class of solid polymeric products having sulfur ranks within the range 10 to 25 and softening temperatures substantially below that of elemental sulfur. These products have a relatively high available sulfur content, with the result that they can be used in relatively small amounts in the vulcanization of rubber. Moreover, since they have a relatively low organic content and can be used in small amounts, they have a much smaller plasticizing effect upon the rubber in which they are incorporated than do the liquid styrene-sulfur compounds of the prior art. The products are sufficiently friable so that they can be readily reduced to a fine powder and incorporated in the rubber using the standard milling techniques common in the rubber industry. Also they have greater bloom-resistance than elemental sulfur.

In general, the products of the present invention can be prepared by mixing styrene and sulfur in the proportions of 10 to 25 moles of sulfur per mole of styrene monomer and heating the mixture at a temperature of 110° to 135° C. for a period of five to thirty hours. Polymeric addition products are formed under these conditions which, upon cooling to room temperature, form friable solids having, as indicated above, a high proportion of available sulfur when used as vulcanizing agents for rubber. The products can be used to vulcanize any of the sulfur-vulcanizable rubbers including natural rubber and synthetic rubbery materials having aliphatic unsaturation. Commercially important rubbers of this type include natural rubber, butadiene 1,3-styrene copolymers, butadiene 1,3-acrylonitrile copolymers, polybutadienes, polyisoprenes, and polychloroprenes. They may be substituted for sulfur in standard vulcanizing formulations and when used in the proportions of 1%–4% by weight, based on the weight of the rubber, give vulcanizates having excellent tensile and elastic properties. Since they are friable solids, they can be readily reduced to powder form and incorporated in the rubber by the usual milling techniques. Curing is effected by heating at temperatures of say 250° F. to 325° F. Because of the less drastic heating cycle made possible by the use of the present compounds, less deterioration of the rubber occurs and hence improved physical properties can be obtained. On the other hand, since the present compounds have a high available sulfur content, they are more efficient than the liquid sulfur-styrene products of the prior art. That is to say, they can be used in smaller amounts and introduce into the vulcanizate a smaller portion of the styrene radicals which as noted above tend to plasticize and soften the vulcanizate. Preferred results have been obtained by using styrene-sulfur polymers having a sulfur rank of about 15.

In order to point out more fully the nature of the present invention, the following specific examples are given of illustrative methods of making the present products and utilizing them as vulcanizing agents in rubber:

Example I

A reaction vessel was charged with 100 moles (3206 grams) of sulfur and 10 moles (1041 grams) of inhibited styrene, and the atmosphere above the mixture of styrene and sulfur was purged with nitrogen. The mixture was agitated and heated at 125° C. for 6.5 hours, during which time nitrogen was bubbled through the reaction mixture. The resulting composition was a dark brown solid polymer having a sulfur rank of 10 and a sulfur content of about 74% by weight. The polymer solidified upon cooling at room temperature in about 70 hours.

Example II

A reaction vessel was charged with 15 moles (481 grams) of sulfur and 1 mole (104 grams) of inhibited styrene, and the atmosphere above the mixture of styrene and sulfur was purged with nitrogen. The mixture was agitated and heated at a temperature of 125° C. for 30 hours during which time nitrogen was bubbled through the reaction mixture. At the end of 30 hours the resulting composition was a dark viscous polymer having a sulfur rank of 15 and a sulfur content of about 82% by weight. It was allowed to stand at room temperature for about 70 hours and cooled to form a brittle yellow solid having a softening point of about 157° F.

During heating of the reaction mixture samples were removed and cooled at the end of 6.5 hours (Sample A), 10 hours (Sample B), and 15 hours (Sample C). These three samples were used to vulcanize rubber as described in Examples VIII, IX, and X, respectively, below.

Example III

Twenty moles (641.2 grams) of sulfur and one mole (104.1 grams) of inhibited styrene were agitated and heated together to 125° C. in a nitrogen-purged atmosphere. The temperature was maintained at 125° C. for 10 hours during which time nitrogen was bubbled through the reaction mixture. The resulting composition was a dark viscous polymer having a sulfur rank of 20. The polymer solidified upon cooling at room temperature in about 70 hours.

Example IV

A mixture of 25 moles (802 grams) of sulfur and 1 mole (104 grams) of inhibited styrene were heated under a nitrogen atmosphere as in Example I at a temperature of 135° C. for 16.5 hours. Nitrogen was bubbled through the reaction mixture during the reaction period. The product was a dark, very viscous polymer having a sulfur rank of about 25 and a sulfur content of about 88% by weight. After cooling at room temperature for a period of 10 to 15 hours, a yellow, very brittle solid polymer was formed having a softening temperature of 160° F.

The solid products of Examples I to IV were reduced to fine powders and were used to vulcanize rubber as illustrated in Examples V to XIII below.

Example V

Two parts by weight of the styrene polysulfide polymer product of rank 10 produced as in Example I was compounded on a rubber mill with an unsaturated elastomeric rubber compound comprised of: 100 parts of GRS–1502 Government Rubber Styrene composition commonly identified as SBR (styrene butadiene rubber), 50 parts "HAF Black" carbon black and 5 parts of "Santocure" accelerator, wherein all parts are by weight. "HAF Black" is a high abrasion furnace black and "Santocure" accelerator is N-cyclohexyl-2-benzothiazole sulfenamide, sold by Monsanto Chemical Company.

The resulting mixture, after aging at room temperature for about 48 hours, was a vulcanizable rubber composition. When subjected to the Mooney scorch resistance test, the composition exhibited a rise of 4 points in an excess of 30 minutes. Press curing the composition at 300° F. for 40 minutes produced a vulcanized rubber material which when tested in accordance with ASTM D395 (Method B) procedure for rubber materials, had the following physical properties: compression set resistance of 72% after heating at 250° F. for 24 hours, and an initial compression of 25%; tensile strength of 3790 p.s.i.; 200% modulus of 1400 p.s.i.; elongation of 370%; and a Shore A hardness of 68.

Example VI

Three parts by weight of a polysulfide polymer product of rank 10 produced as described in Example I above was compounded on a rubber mill with 155 parts of the unsaturated elastomeric rubber compound described in Example V. The product, after aging at room temperature for about 48 hours, was a vulcanizable rubber compound. Testing and curing procedures used in this example were the same as described in Example V, and they produced a vulcanized rubber material having the following physical properties: Mooney scorch resistance of 4 point rise in excess of 30 minutes; compression set resistance of 70%; tensile strength of 3390 p.s.i.; 200% modulus of 1580 p.s.i.; elongation of 340%; and a hardness of Shore A 71.

Example VII

Four parts by weight of a polysulfide polymer product of rank 10 produced as described in Example I was compounded on a rubber mill with 155 parts of the unsaturated elastomeric rubber compound described in Example V. The product, after aging at room temperature about 48 hours, was a vulcanizable rubber compound. Testing and curing procedures used in this example were the same as described in Example V and resulted in a vulcanized rubber material having the following physical properties: Mooney scorch resistance of 4 point rise in excess of 30 minutes; compression set resistance of 71%; tensile strength of 3300 p.s.i.; 200% modulus of 2330 p.s.i.; elongation of 260%; and a hardness of Shore A 72.

Example VIII

Two parts by weight of the styrene polysulfide polymer of rank 15 produced as described in Example II, and more particularly Sample A of Example II, was compounded on a rubber mill with 155 parts of the unsaturated elastomeric rubber compound described in Example V. The product, after aging at room temperature for about 48 hours, was a vulcanizable rubber compound. The testing and curing procedures used in this example were the same as described in Example V, and they resulted in a vulcanized rubber material having the following physical properties: Mooney scorch resistance of 4 point rise in excess of 30 minutes; compression set resistance of 62%; tensile strength of 3820 p.s.i.; 200% modulus of 1950 p.s.i.; elongation of 300%; and a hardness of Shore A 71.

Example IX

Two parts by weight of the styrene polysulfide polymer of rank 15 produced as described in Example II, and more particularly, Sample B of Example II, was compounded on a rubber mill with 155 parts of the unsaturated elastomeric rubber compound of Example V. The product, after aging at room temperature about 48 hours, was a vulcanizable rubber compound. The testing and curing procedures used in this example were the same as described in Example V, and they resulted in a vulcanized rubber material having the following physical properties: Mooney scorch resistance of 4 point rise in excess of 30 minutes; compression set resistance of 60%; tensile strength of 3700 p.s.i.; 200% modulus of 2000 p.s.i.; elongation of 320%; and a hardness of Shore A 71.

Example X

Two parts by weight of the styrene polysulfide polymer of rank 15 produced as in Example II, and more particularly, Sample C of Example II, was compounded on a rubber mill with 155 parts of the unsaturated elastomeric rubber compound described in Example V. The product, after aging at room temperature for about 48 hours, was a vulcanizable rubber compound. Testing and curing procedures used in this example were the same as described in Example V, and they resulted in a vulcanized rubber material having the following physical properties: Mooney scorch resistance of 4 point rise in excess of 30 minutes; compression set resistance of 60%; tensile strength of 4100 p.s.i.; 200% modulus of 2000 p.s.i.; elongation of 350%; and a hardness of Shore A 70.

*Example XI*

Two parts by weight of the sulfur-styrene polymer of rank 15 as produced in Example II above, and more particularly, Sample A of Example II, was compounded on a rubber mill with an unsaturated elastomeric rubber compound comprised of: 100 parts by weight of butadiene-styrene rubber (Philprene 1502 produced by Phillips Petroleum Co.), 15 parts of "HAF Black" carbon black, 5 parts of zinc oxide, 1 part of stearic acid, and 1.25 parts of "Santocure" accelerator. The resulting mixture was aged at room temperature for about 48 hours and was then ready for vulcanization.

A composition as thus prepared was tested in various ways to determine its properties. It was found that when the composition was subjected to the Mooney scorch resistance test, it exhibited a rise of 4 points in excess of 30 minutes. When the composition was press cured at 300° F. for 40 minutes, it produced a vulcanized rubber having the following properties: compression set resistance of 62%; tensile strength of 3830 p.s.i.; 200% modulus of 1950 p.s.i.; elongation of 300%; Shore A hardness of 71. The polymer used in this formulation provides an especially good balance of curing performance and non-blooming characteristics.

*Example XII*

Two parts by weight of the polysulfied polymer product of rank 20 produced in Example III was compounded on a rubber mill with 155 parts of the unsaturated elastomeric rubber compound described in Example V. The product, after aging at room temperature for about 48 hours, was a vulcanizable rubber compound. Testing and curing procedures used in this example were the same as described in Example V, and they resulted in a vulcanized rubber material having the following physical properties: Mooney scorch resistance of 4 point rise in excess of 30 minutes; compression set resistance of 58%; tensile strength of 3800 p.s.i.; 200% modulus of 1740 p.s.i.; elongation of 350%; and a hardness of Shore A 70.

*Example XIII*

Two parts by weight of the styrene-sulfur polymer of the rank 25 produced as described in Example IV was compounded on a rubber mill with 122.25 parts of the unsaturated rubber compound of Example XI. The milled product was aged at room temperature for about 48 hours and tested using the test procedures of Example V. Its properties were as follows: Mooney scorch resistance of 4 point rise in excess of 30 minutes; compression set resistance of 58%; tensile strength of 3830 p.s.i.; 200% modulus of 1580 p.s.i.; elongation of 350%; and Shore A hardness of 70.

From the foregoing examples it should be apparent that the present invention provides a novel group of solid styrene-sulfur compounds that are exceptionally useful as vulcanizing agents for rubbers. These solid vulcanizing agents eliminate a number of the disadvantages of elemental sulfur and the liquid styrene-sulfur products of the prior art while at the same time combining the advantages of both of these prior vulcanizing agents. It is of course to be understood that the foregoing examples are illustrative only and that numerous changes can be made in the ingredients, proportions, and conditions specifically set forth therein without departing from the spirit of the invention as set forth in the appended claims.

We claim:

1. A friable solid polymer of styrene and sulfur having a sulfur rank of 10 to 25.

2. A polymer according to claim 1 and wherein the sulfur rank is about 15.

3. A method of making a friable solid polymer of styrene which comprises heating a mixture of styrene and sulfur wherein the molar ratio of sulfur to styrene is from 10 to 25 at a temperature of 110° to 135° C. to form said solid polymer.

4. The method of producing a vulcanized rubber which comprises mixing a sulfur-vulcanizable rubber with from 1% to 4% by weight based on the weight of said rubbery material, of a solid styrene-sulfur polymer having a sulfur rank of from 10 to 25, and curing the resulting mixture at a temperature of from about 250° to about 325° F.

5. A method according to claim 4 and wherein the styrene-sulfur polymer used has a sulfur rank of about 15.

6. A vulcanizable rubbery composition comprising a major proportion of a sulfur-vulcanizable rubber and from 1 to 4% by weight, based on the weight of said rubber, of a styrene-sulfur polymer having a sulfur rank of from 10 to 25.

7. A vulcanizable composition according to claim 6, and wherein the rubber is a copolymer of butadiene and styrene and the styrene-sulfur polymer has a sulfur rank of about 15.

References Cited by the Examiner

UNITED STATES PATENTS 2,989,513   6/1961   Hendry et al. _____ 260—79

LEON J. BERCOVITZ, *Primary Examiner.*

JOSEPH LIBERMAN, *Examiner.*